(12) United States Patent
Kawabata

(10) Patent No.: US 11,283,949 B2
(45) Date of Patent: Mar. 22, 2022

(54) INFORMATION PROCESSING SYSTEM THAT DISPLAYS CUSTOM OPERATION SCREEN ON INFORMATION PROCESSING APPARATUS THAT IS DIFFERENT FROM AND DOES NOT COMMUNICATE WITH INFORMATION PROCESSING APPARATUS PERFORMING CUSTOMIZATION, AND NON-TRANSITORY COMPUTER READABLE MEDIUM

(71) Applicant: FUJIFILM Business Innovation Corp., Tokyo (JP)

(72) Inventor: Kazuya Kawabata, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 195 days.

(21) Appl. No.: 16/542,286

(22) Filed: Aug. 15, 2019

(65) Prior Publication Data
US 2020/0068080 A1 Feb. 27, 2020

(30) Foreign Application Priority Data
Aug. 24, 2018 (JP) .............................. JP2018-156858

(51) Int. Cl.
*H04N 1/00* (2006.01)
*G06F 3/12* (2006.01)

(52) U.S. Cl.
CPC ....... *H04N 1/00514* (2013.01); *G06F 3/1208* (2013.01); *G06F 3/1256* (2013.01); *H04N 1/00411* (2013.01); *G06F 3/1292* (2013.01)

(58) Field of Classification Search
None
See application file for complete search history.

(56) References Cited

U.S. PATENT DOCUMENTS

| | | | |
|---|---|---|---|
| 2011/0007351 A1* | 1/2011 | Kurumasa | H04N 1/0035 358/1.15 |
| 2015/0201099 A1* | 7/2015 | Hamasaki | H04N 1/00318 358/1.15 |
| 2016/0065758 A1* | 3/2016 | Kang | H04N 1/00392 358/1.15 |
| 2018/0275945 A1* | 9/2018 | Hamada | H04N 1/00411 |
| 2020/0125305 A1* | 4/2020 | Mihira | H04L 67/02 |

FOREIGN PATENT DOCUMENTS

JP 2009-192604 8/2009

* cited by examiner

*Primary Examiner* — Henok Shiferaw
(74) *Attorney, Agent, or Firm* — JCIPRNET

(57) ABSTRACT

An information processing system includes a first information processing apparatus including a generating unit that generates personal setting information that is used to set an operation screen on a per user basis, and a transmitting unit that transmits the personal setting information generated by the generating unit to an external apparatus, and a portable terminal apparatus including a memory that saves the personal setting information transmitted by the first information processing apparatus, and a transmitting unit that, when the portable terminal apparatus is linked to a second information processing apparatus different from the first information processing apparatus having generated the personal setting information, transmits the personal setting information saved on the memory to the second information processing apparatus.

16 Claims, 13 Drawing Sheets

FIG. 1
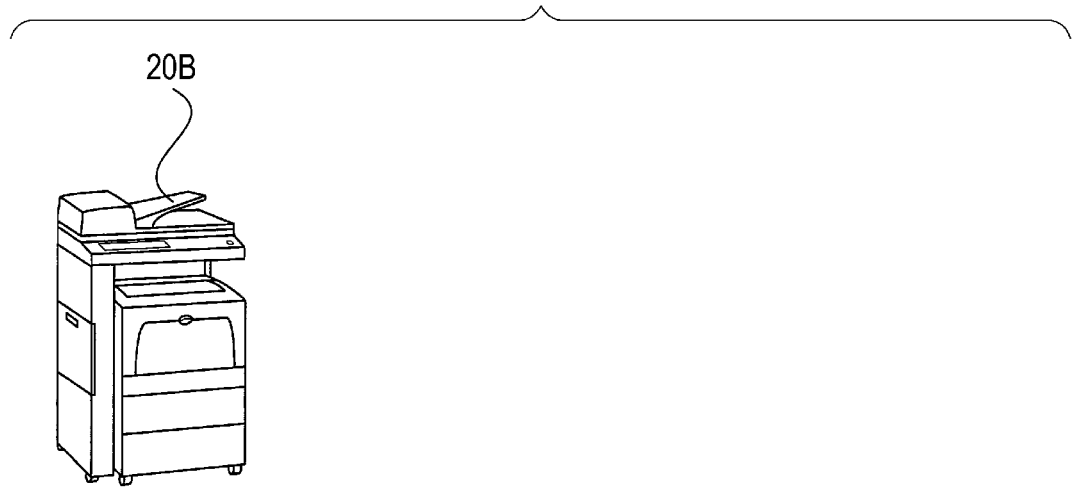
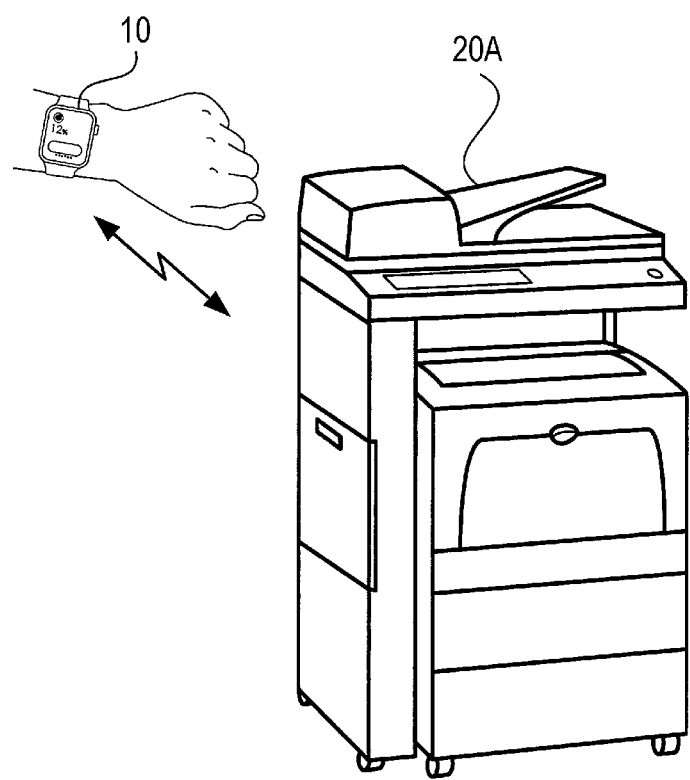

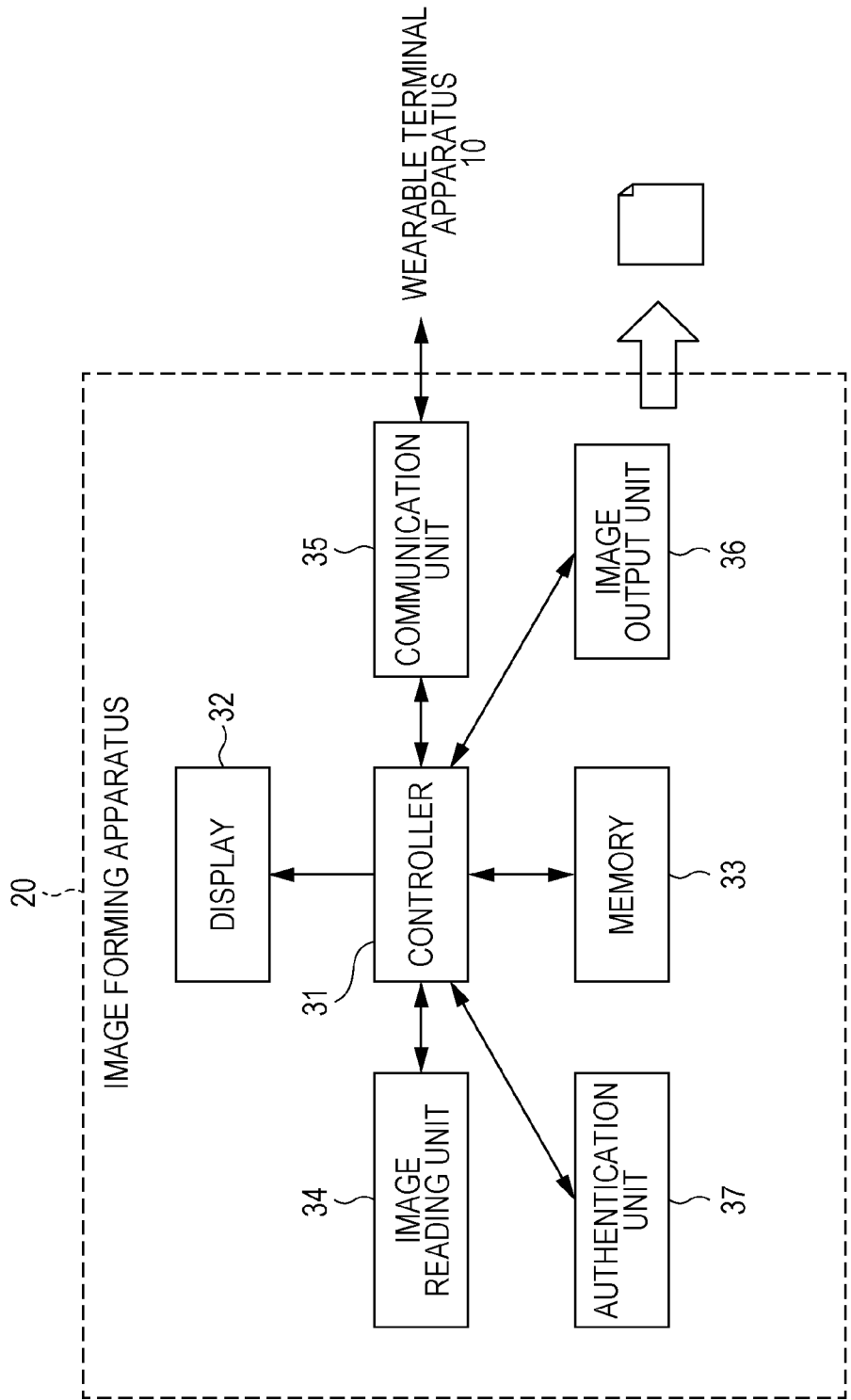

FIG. 6A

| ORDER OF DISPLAY | 1 | 2 | 3 | 4 | 5 |
|---|---|---|---|---|---|
| FUNCTION MENU | COPY | FAX | PRINT | EMAIL | SCAN |

FIG. 6B

| FUNCTION MENU / DISPLAY LOCATION | 1 | 2 | 3 | 4 | 5 |
|---|---|---|---|---|---|
| x | 0 | 20 | 40 | 0 | 20 |
| y | 0 | 0 | 0 | 10 | 10 |

FIG. 6C

| FUNCTION MENU / DISPLAY LOCATION | 1 | 2 | 3 | 4 | 5 |
|---|---|---|---|---|---|
| x | 20 | 20 | 20 | 0 | 0 |
| y | 0 | 10 | 20 | 0 | 10 |

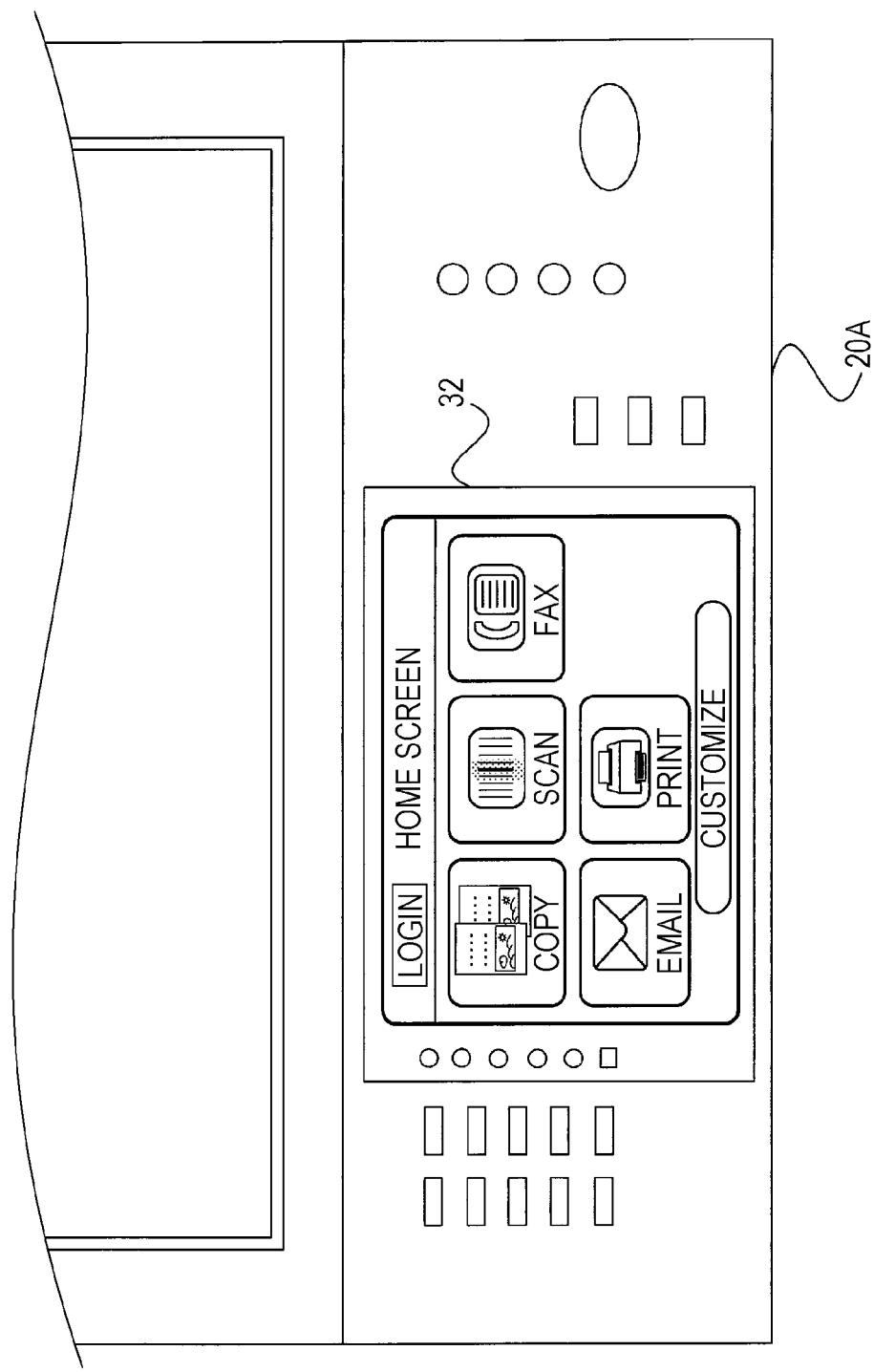

INFORMATION PROCESSING SYSTEM THAT DISPLAYS CUSTOM OPERATION SCREEN ON INFORMATION PROCESSING APPARATUS THAT IS DIFFERENT FROM AND DOES NOT COMMUNICATE WITH INFORMATION PROCESSING APPARATUS PERFORMING CUSTOMIZATION, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-156858 filed Aug. 24, 2018.

BACKGROUND

(i) Technical Field

The present disclosure relates to an information processing system, and a non-transitory computer readable medium.

(ii) Related Art

Japanese Unexamined Patent Application Publication No. 2009-192604 discloses an image forming apparatus that permits a screen on a panel to be customized. The image forming apparatus includes a medium detecting unit that detects a link of an external medium having custom data of the screen, and a process execution unit that executes a display process of the screen in accordance with the custom data.

SUMMARY

Aspects of non-limiting embodiments of the present disclosure relate to an information processing system that displays a custom operation screen on an information processing apparatus that is different from and does not communicate with an information processing apparatus having customized the operation screen.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system. The information processing system includes a first information processing apparatus including a generating unit that generates personal setting information that is used to set an operation screen on a per user basis, and a transmitting unit that transmits the personal setting information generated by the generating unit to an external apparatus, and a portable terminal apparatus including a memory that saves the personal setting information transmitted by the first information processing apparatus, and a transmitting unit that, when the portable terminal apparatus is linked to a second information processing apparatus different from the first information processing apparatus having generated the personal setting information, transmits the personal setting information saved on the memory to the second information processing apparatus.

BRIEF DESCRIPTION OF THE DRAWINGS

Exemplary embodiment of the present disclosure will be described in detail based on the following figures, wherein:

FIG. 1 illustrates an information processing system of an exemplary embodiment of the disclosure;

FIG. 5 illustrates a functional configuration of the image forming apparatus of the exemplary embodiment of the disclosure;

FIGS. 6A through 6C illustrate examples of custom information;

FIG. 8 illustrates an operation screen of an image forming apparatus of the exemplary embodiment of the disclosure;

DETAILED DESCRIPTION

An exemplary embodiment of the disclosure is described in connection with the drawings.

FIG. 1 illustrates the system configuration of an information processing system of an exemplary embodiment of the disclosure.

Referring to FIG. 1, the information processing system of the exemplary embodiment of the disclosure includes a wearable terminal apparatus 10 serving as a portable terminal apparatus to be worn by a user, and image forming apparatuses 20A and 20B serving as information processing apparatuses.

The wearable terminal apparatus 10 is linked to each of the image forming apparatuses 20A and 20B via near field communication, such as Bluetooth (registered trademark) communication, and transmits or receives information to or from each of the image forming apparatuses 20A and 20B.

The wearable terminal apparatus 10 generates a print job, and transmits the generated print job to the image forming apparatus 20A or 20B via Bluetooth communication (registered trademark).

The image forming apparatus 20A or 20B receives the print job transmitted from the wearable terminal apparatus 10, and outputs onto a paper sheet an image responsive to the print job.

Each of the image forming apparatuses 20A and 20B is a multifunction apparatus having functions for print, scan, copy, and/or fax.

In the discussion that follows, the image forming apparatus 20A in the information processing system of the exemplary embodiment customizes the display for function menus for copy, scan, email, and print on an operation screen, and sets and registers the custom (customized) display. The wearable terminal apparatus 10 is used to display, on the image forming apparatus 20B, the custom screen that is set and registered in the image forming apparatus 20A.

Figure 2:
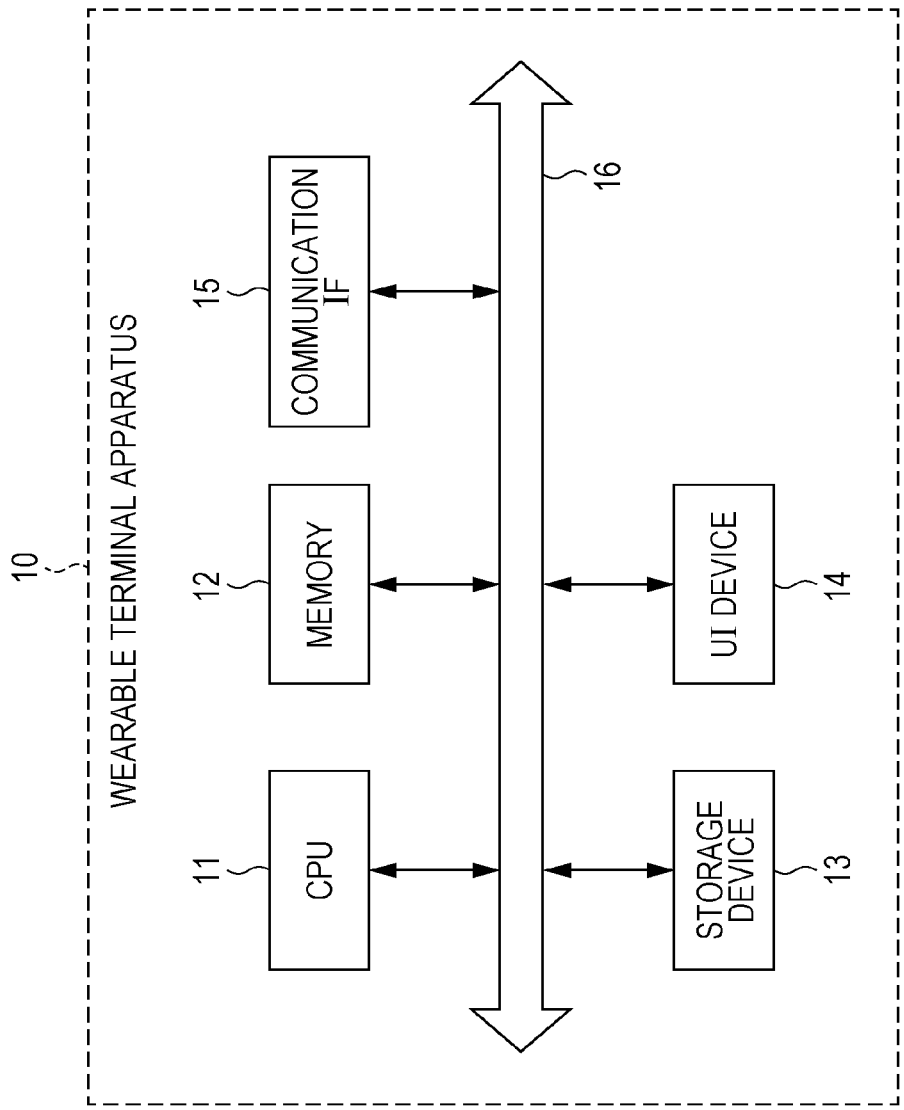
FIG. 2 is a block diagram illustrating a hardware configuration of a wearable terminal apparatus of the exemplary embodiment of the disclosure.

FIG. 2 illustrates the hardware configuration of the wearable terminal apparatus 10 in the information processing system of the exemplary embodiment.

Referring to FIG. 2, the wearable terminal apparatus 10 includes a central processing unit (CPU) 11, a memory 12 that temporarily stores data, a storage device 13, such as a hard disk drive (HDD), a user interface (UI) device 14 including a touch panel or a liquid-crystal display (LCD) and a keyboard, and a communication interface (IF) 15 that transmits or receives data to or from an external device. These elements are interconnected to each other via a control bus 16.

The CPU 11 controls the operation of the wearable terminal apparatus 10 by executing a predetermined process in accordance with a control program saved on the memory 12 or the storage device 13. According to the exemplary embodiment, the CPU 11 reads and executes the control program saved on the memory 12 or the storage device 13. Alternatively, the control program may be saved on a storage medium, such as a memory card, and may be then provided to the CPU 11.

Figure 3:
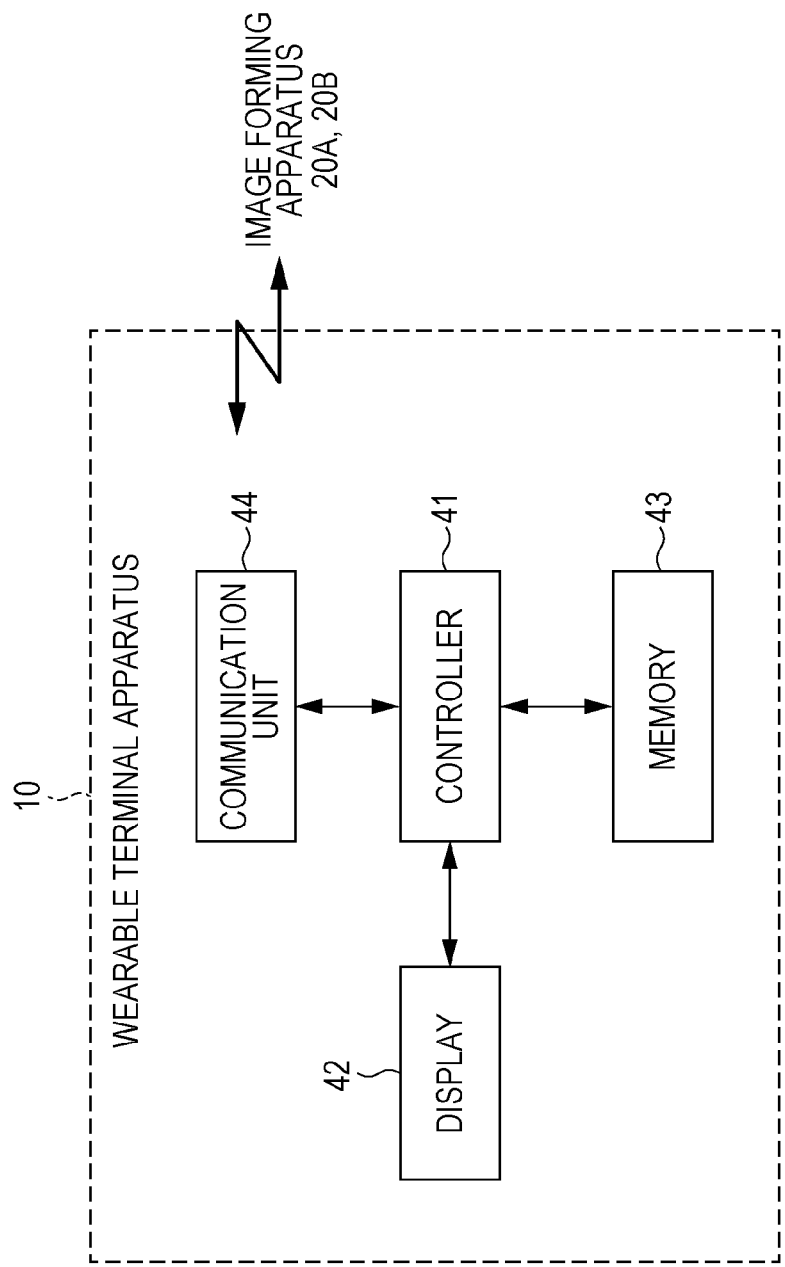
FIG. 3 illustrates a functional configuration of the wearable terminal apparatus of the exemplary embodiment of the disclosure.

FIG. 3 illustrates the functional block diagram of the wearable terminal apparatus 10 that is implemented by executing the control program.

Referring to FIG. 3, the wearable terminal apparatus 10 of the exemplary embodiment includes a controller 41, a display 42, a memory 43, and a communication unit 44.

The memory 43 saves custom information serving as personal setting information on an operation screen. The custom information is used to set the operation screen on a per user basis. For example, the custom information may be an order of display of the function menus for copy, fax, print, email, and/or scan, the size of the display, the size of the function menu, and the display location of each function menu.

Via Bluetooth (registered trademark) communication, the communication unit 44 transmits or receives data to or from other apparatuses, including the image forming apparatuses 20A and 20B. If the wearable terminal apparatus 10 is linked to the image forming apparatus 20B different from the image forming apparatus 20A that has generated the custom information, the communication unit 44 transmits the custom information saved on the memory 43 to the image forming apparatus 20B.

The display 42 includes the operation screen of a touch panel, receives an operation to be performed on the image forming apparatus 20A or 20B, and displays operation results or process results to a user. The display 42 displays the operation screen (hereinafter referred to as custom screen) generated by the image forming apparatus 20A, using the custom information transmitted from the image forming apparatus 20A or the custom information saved on the memory 43.

When the custom screen transmitted from the image forming apparatus 20A is displayed on the display 42, the controller 41 functions as a display controller that performs control to temporarily suspend the display function (operation function) on the operation screen of the image forming apparatus 20B. The controller 41 also functions as an operation controller that controls the operation of the image forming apparatus 20B in response to an operation performed by the user on the custom screen displayed on the display 42.

The controller 41 performs control to modify display contents of the custom screen transmitted from the image forming apparatus 20A, to match with the size of the operation screen of the display 42. Specifically, the controller 41 performs control to modify the size of the custom screen, transmitted from the image forming apparatus 20A, to match with the size of the operation screen of the display 42, and then displays the custom screen in the modified size. Furthermore, the controller 41 performs control to display the custom screen, transmitted from the image forming apparatus 20A, across multiple pages to match with the size of the operation screen of the display 42.

Figure 4:
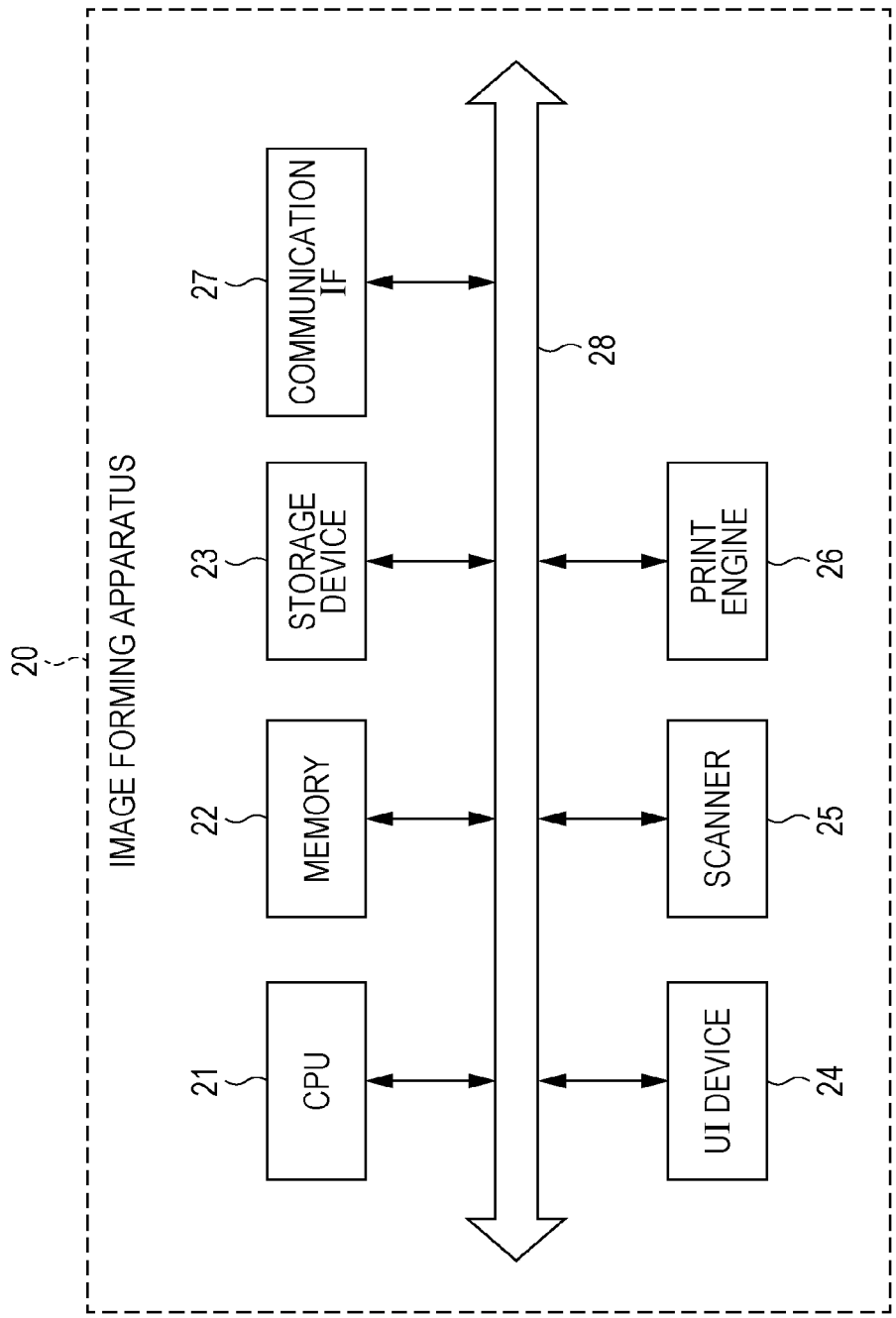
FIG. 4 is a block diagram illustrating a hardware configuration of an image forming apparatus of the exemplary embodiment of the disclosure.

FIG. 4 illustrates the hardware configuration of an image forming apparatus 20 in the information processing system of the exemplary embodiment. The image forming apparatuses 20A and 20B are representatively referred to as the image forming apparatus 20 when elements common to the image forming apparatuses 20A and 20B are described later.

Referring to FIG. 4, the image forming apparatus 20 includes a CPU 21, a memory 22 that temporarily stores data, a storage device 23, such as an HDD, a UI device 24 including a touch panel or an LCD and a keyboard, a scanner 25, a print engine 26, and a communication IF 27 that transmits or receives data to or from an external device. These elements are interconnected to each other via a control bus 28.

The print engine 26 prints an image on a recording medium, such as a paper sheet, via charging, exposure, development, transfer, fixing operations, and the like.

The CPU 21 controls the operation of the image forming apparatus 20 by executing a predetermined process in accordance with a control program saved on the memory 22 or the storage device 23. According to the exemplary embodiment, the CPU 21 executes the process by reading and executing the control program saved on the memory 22 or the storage device 23. The control program may be provided to the CPU 21 in the recorded form on a storage medium, such as a compact disk read-only memory (CD-ROM).

FIG. 5 is a functional block diagram of the image forming apparatus 20 that is implemented by executing the control program.

Referring to FIG. 5, the image forming apparatus 20 includes a controller 31, a display 32, a memory 33, an image reading unit 34, a communication unit 35, an image output unit 36, and an authentication unit 37.

The display 32 includes the operation screen of a touch panel, and receives an operation to be performed on the image forming apparatus 20, and displays operation results or process results to a user. The display 32 functions as a generating unit that generates custom information that is used to set an operation screen on a per user basis.

The memory 33 temporarily saves data, such as print job. The memory 33 also saves the custom information as personal setting information of the operation screen.

The communication unit 35 transmits or receives data to or from the wearable terminal apparatus 10. The communication unit 35 thus receives a print job from the wearable terminal apparatus 10, transmits image data via fax, or transmits or receives an email. The communication unit 35 also transmits operation results, process results, or the like to the wearable terminal apparatus 10. The communication unit 35 further transmits or receives custom information to or from the wearable terminal apparatus 10 when the image forming apparatus 20 is linked to (communicates with) the wearable terminal apparatus 10.

The authentication unit 37 authenticates a user who is going to use the image forming apparatus 20 via authentication, based on inputting identification (ID) and a password or based on an integrated circuit (IC) card. The authentication unit 37 performs an authentication operation when linked to the wearable terminal apparatus 10 (when communicating with the wearable terminal apparatus 10).

The controller 31 performs control to display the custom screen using custom information transmitted from the wearable terminal apparatus 10 or custom information saved on the memory 33.

If the size of the operation screen of the image forming apparatus 20B is different from the size of the operation screen of the image forming apparatus 20A that has generated the custom information, the controller 31 performs control to modify the display contents of the custom screen, transmitted from the wearable terminal apparatus 10, to match with the size of the operation screen of the image forming apparatus 20B. Specifically, the controller 31 performs control to modify the size of the custom screen, transmitted from the wearable terminal apparatus 10, to match with the size of the operation screen of the image forming apparatus 20B. The controller 31 performs control to display the custom screen, transmitted from the wearable terminal apparatus 10, across multiple pages to match with the size of the operation screen of the image forming apparatus 20B.

The image output unit 36 outputs an image onto a recording medium, such as a print paper sheet. The image reading unit 34 reads a document image by scanning an original document.

Figure 7A:
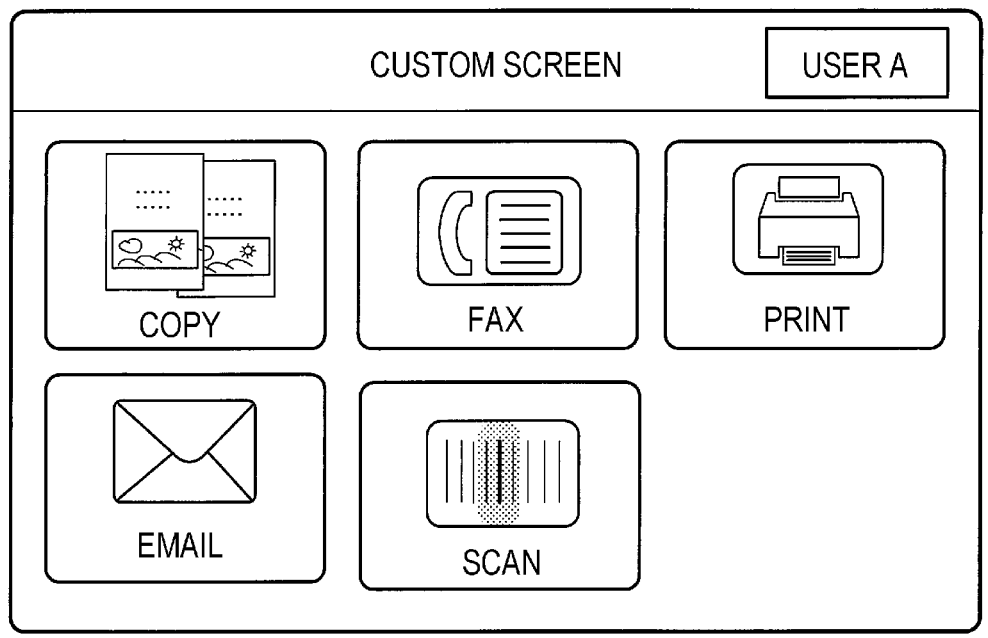
FIGS. 7A and 7B illustrate display examples of a custom screen.
Figure 7B:
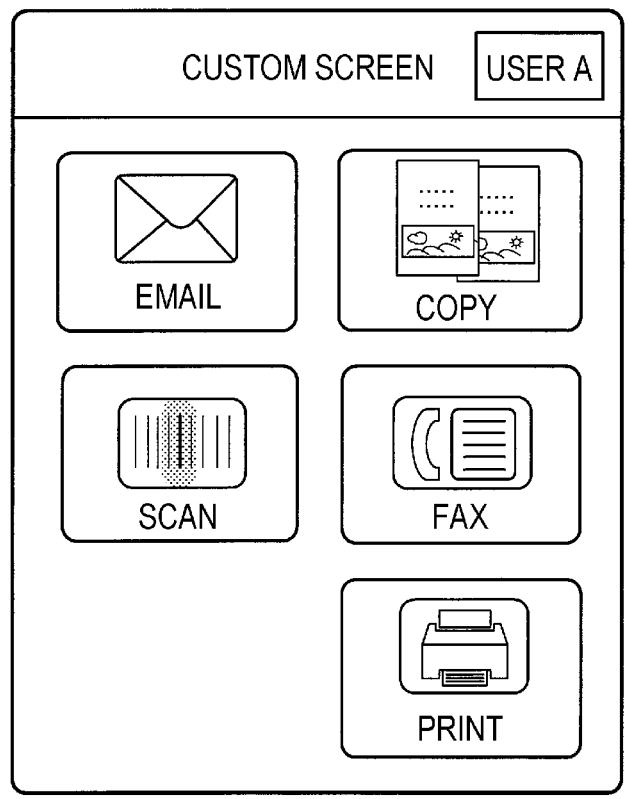

FIGS. 6A through 6C illustrate examples of the custom information saved on the memory 33 and/or the memory 43. FIG. 7A illustrates an example of the custom screen generated using the custom information of FIGS. 6A and 6B. FIG. 7B illustrates an example of the custom screen generated using the custom information of FIGS. 6A and 6C.

The custom information relates to the size of the display 32, the size of the function menu displayed on the display 32, the order of display of the function menus for copy, fax, print, email, and scan, the display location of each function menu on the display 32, and the like. The display location of the function menu is a position in coordinates of the display 32. For example, the top left corner of the function menu at the top left corner of the display 32 (copy in FIG. 7A and email in FIG. 7B) is designated the origin (0, 0), and the horizontal axis is designated the x axis, and the vertical axis is designated the y axis. The coordinates of the top left corner of each function menu are saved as the custom information. For example, the custom screen of FIG. 7A is displayed using the custom information of FIGS. 6A and 6B. The custom screen of FIG. 7B is displayed using the custom information of FIGS. 6A and 6C.

Figure 9:
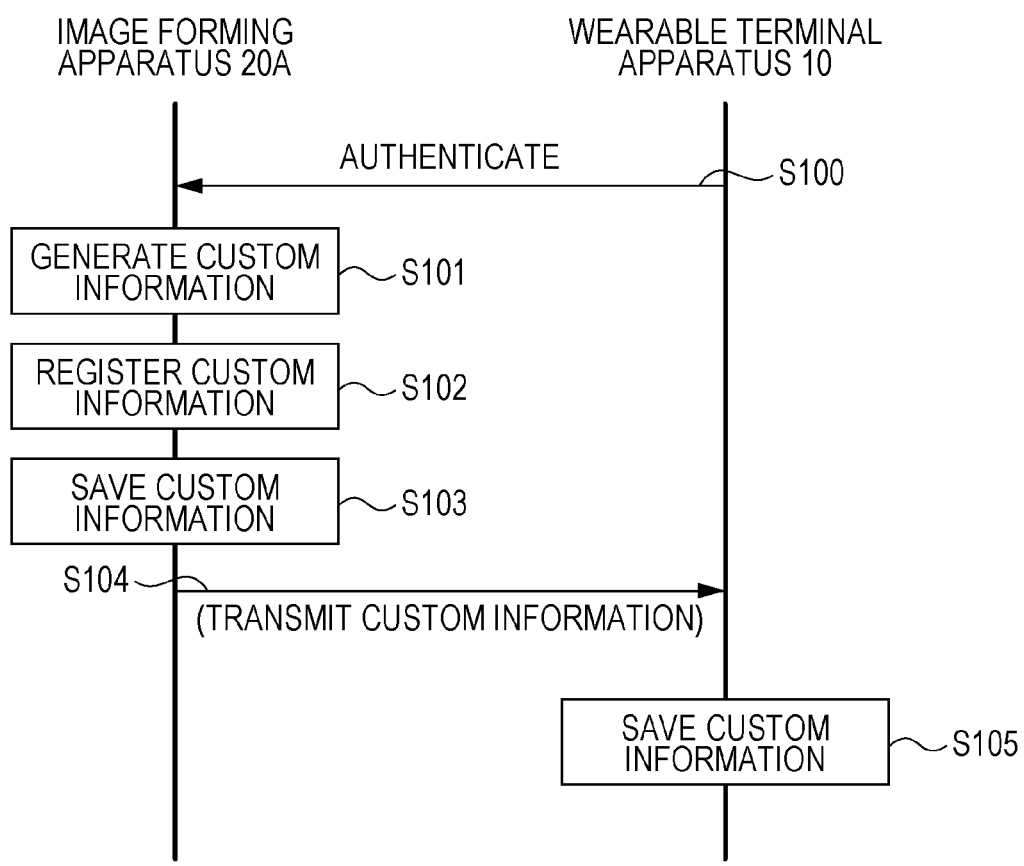
FIG. 9 illustrates an operation of the image forming apparatus and the wearable terminal apparatus of the exemplary embodiment of the disclosure.

The operations of the image forming apparatus 20A and the wearable terminal apparatus 10 are described in connection with FIGS. 8 and 9.

In the discussion that follows, the display of the function menus on the operation screen for copy, fax, print, email, and scan is customized on the image forming apparatus 20A, and the custom display for a user A is pre-registered as the custom information, and the custom information is saved on the wearable terminal apparatus 10.

The operation screen (home screen) having multiple function menus for copy, scan, fax, email, and print displayed thereon is displayed on the display 32 of the image forming apparatus 20A as illustrated in FIG. 8. A user moves the wearable terminal apparatus 10 closer to within communication coverage of the image forming apparatus 20A. If the wearable terminal apparatus 10 is authenticated by the authentication unit 37 of the image forming apparatus 20A (step S100), a custom registration screen is displayed. The order of display of each function menu, and the display location are input or selected to generate the custom information (step S101). The custom information is registered by specifying a saving destination (step S102). The custom information for the user A is saved on the memory 33 of the image forming apparatus 20A (step S103). The custom information is transmitted to the wearable terminal apparatus 10 (step S104). The wearable terminal apparatus 10 saves the custom information, transmitted from the image forming apparatus 20A, on the memory 43 (step S105).

Figure 10:
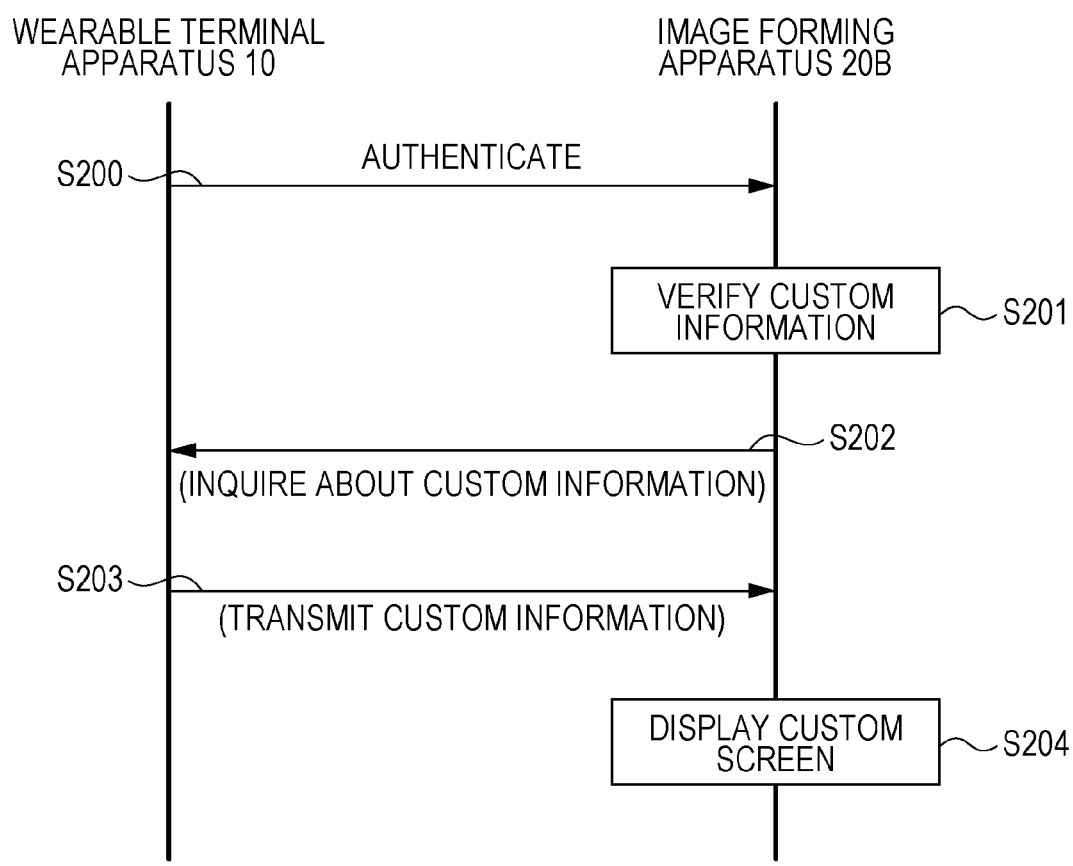
FIG. 10 illustrates an operation of another image forming apparatus and the wearable terminal apparatus of the exemplary embodiment of the disclosure.

The operations of the wearable terminal apparatus 10 and the image forming apparatus 20B are described in connection with FIG. 10.

In the discussion that follows, the custom information for the user A is not saved on the image forming apparatus 20B, and the custom screen for the user A is displayed on the operation screen of the image forming apparatus 20B using the custom information for the user A saved on the wearable terminal apparatus 10.

The wearable terminal apparatus 10 is moved closer to within the communication coverage of the image forming apparatus 20B. If the wearable terminal apparatus 10 is authenticated by the authentication unit 37 of the image forming apparatus 20B (step S200), the image forming apparatus 20B determines whether the custom information for the user A authenticated by the authentication unit 37 is saved on the memory 33 of the image forming apparatus 20B (step S201). If the image forming apparatus 20B determines that the custom information for the user A is not saved on the memory 33 of the image forming apparatus 20B, the communication unit 35 enquires whether the custom information for the user A is saved on the memory 43 of the wearable terminal apparatus 10 (step S202). Since the custom information for the user A is saved on the memory 43 of the wearable terminal apparatus 10, the wearable terminal apparatus 10 transmits the custom information for the user A to the image forming apparatus 20B (step S203). The custom screen that has been generated using the custom information for the user A is displayed on the operation screen of the image forming apparatus 20B (step S204).

Figure 11:
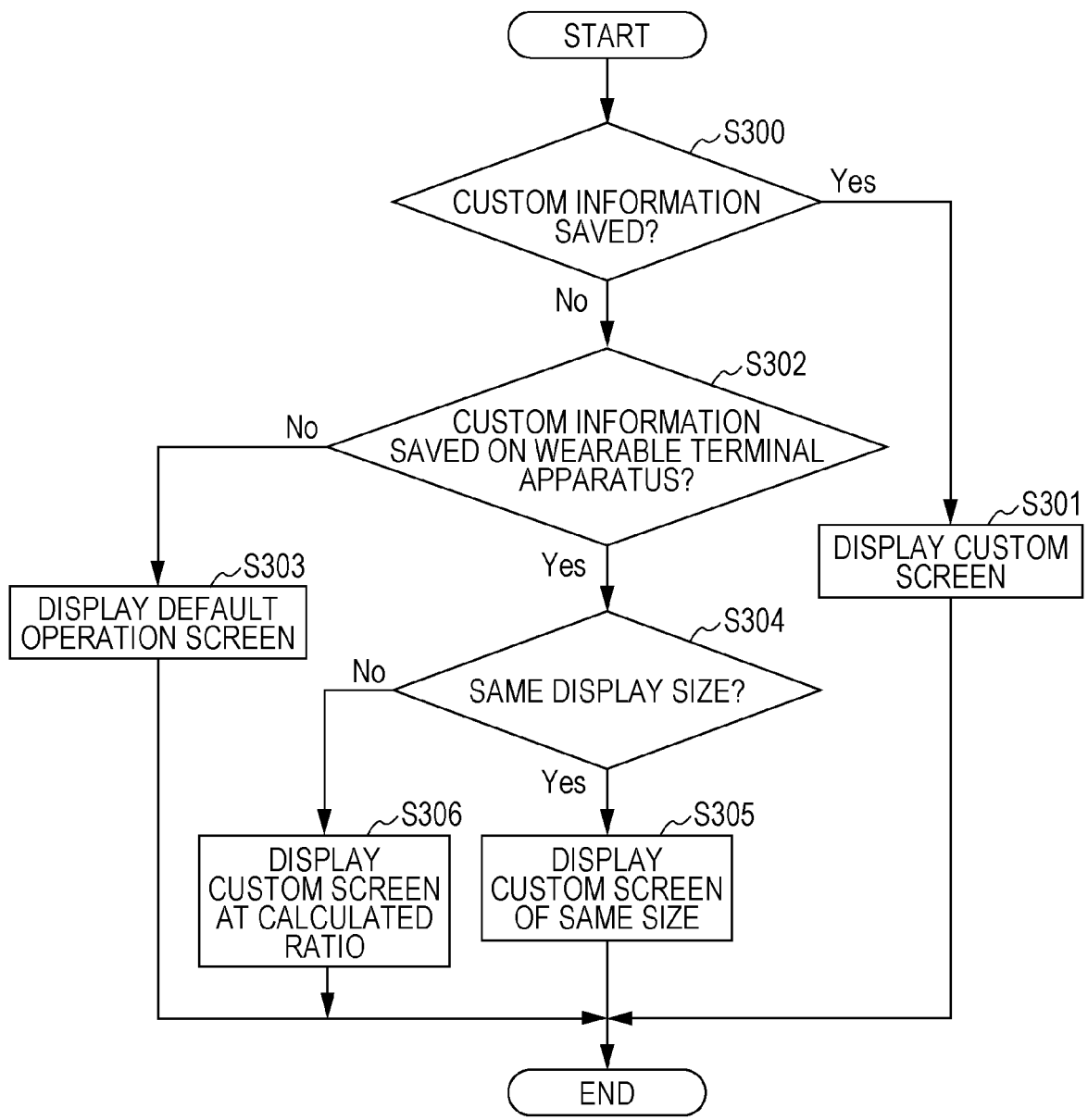
FIG. 11 illustrates an operation of the other image forming apparatus of the exemplary embodiment of the disclosure.

The operation of the image forming apparatus 20B is described in detail in connection with FIG. 11.

The image forming apparatus 20B determines whether the custom information for the user A identified by the authentication unit 37 is saved on the memory 33 (step S300). If the custom information for the user A is saved on the memory 33 of the image forming apparatus 20B (yes branch from step S300), the controller 31 performs control to display on the display 32 the custom screen that has been generated using the custom information for the user A (step S301).

If the custom information for the user A is not saved on the memory 33 (no branch from step S300), the controller 31 determines whether the custom information for the user A is saved on the wearable terminal apparatus 10 (step S302). If the custom information for the user A is not saved on the wearable terminal apparatus 10 (no branch from step S302), a default operation screen is displayed on the display 32 of the image forming apparatus 20B (step S303).

If the custom information for the user A is saved on the wearable terminal apparatus 10 (yes branch from step S302), the image forming apparatus 20B retrieves the custom information for the user A from the wearable terminal apparatus 10 and compares the size of the display 32 of the image forming apparatus 20A with the size of the display 32 of the image forming apparatus 20B. The size data is contained in the retrieved custom information for the user A. The image forming apparatus 20B thus determines whether the display 32 of the image forming apparatus 20A is equal in size to the display 32 of the image forming apparatus 20B (step S304).

If the display 32 of the image forming apparatus 20A is equal in size to the display 32 of the image forming apparatus 20B (yes branch from step S304), the image forming apparatus 20B displays the custom information by displaying the function menu of function menu display order on the display 32 using the size of the function menu and the display location of the function menu contained in the retrieved custom information (step S305).

Figure 12:
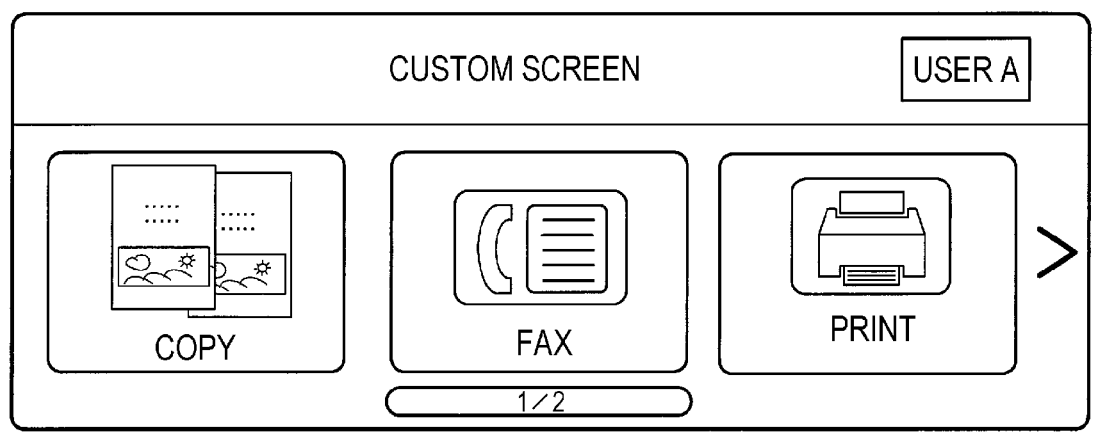
FIG. 12 illustrates a modification of the custom screen.
Figure 13:
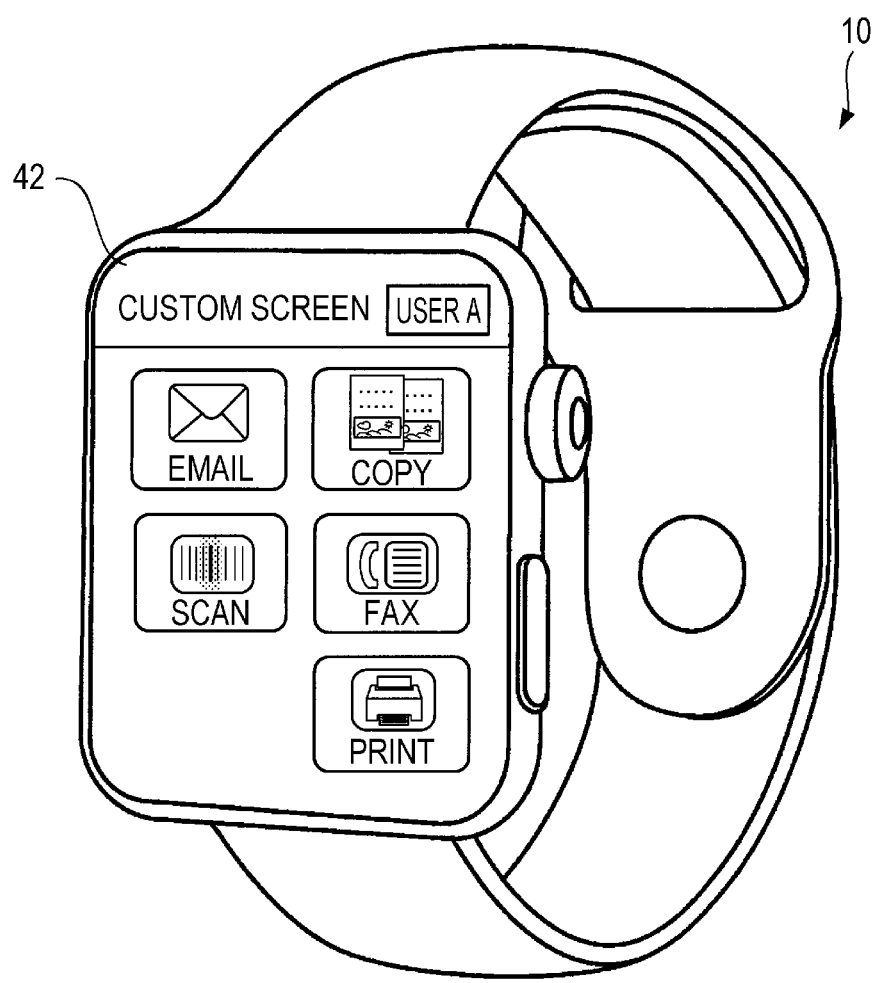
FIG. 13 illustrates display examples of the custom screen displayed on a display of the wearable terminal apparatus of the exemplary embodiment of the disclosure.

If the display 32 of the image forming apparatus 20A is different in size from the display 32 of the image forming apparatus 20B (no branch from step S304), the image forming apparatus 20B computes a size ratio to balance with the size of the display 32 of the image forming apparatus 20B using the size of the function menu and the display location of the function menu contained in the retrieved custom information. Using the size of the function menu and the display location of the function menu contained in the custom information with the ratio thereof computed, the custom screen is displayed by displaying the function menu of the function menu display order on the display 32 (step S306). If the display 32 of the image forming apparatus 20A is different in size from the display 32 of the image forming apparatus 20B, the function menu display of the custom screen generated using the custom information transmitted from the wearable terminal apparatus 10 may be displayed across multiple pages as illustrated in FIG. 12.

Referring to 13, the custom screen transmitted from the image forming apparatus 20A may be displayed on the display 42 of the wearable terminal apparatus 10.

The display contents of the operation screen generated using the custom information transmitted from the image forming apparatus 20A are modified to match with the size of the display 42 of the wearable terminal apparatus 10. Specifically, the controller 41 performs control to modify the size of the operation screen, generated using the custom information transmitted from the image forming apparatus 20A, to match with the size of the operation screen of the display 42 and display the operation screen in the modified size. Further, the controller 41 performs control to display the operation screen, generated using the custom information transmitted from the image forming apparatus 20A, across multiple pages to match with the size of the operation screen of the display 42.

When the operation screen generated using the custom information transmitted from the image forming apparatus 20A is displayed on the display 42, the controller 41 performs control to temporarily suspend the display function (operation function) on the operation screen of the image forming apparatus 20B. Using the custom screen displayed on the display 42, the user performs a copy operation, a print operation, or the like on the image forming apparatus 20B.

According to the exemplary embodiment, the image forming apparatuses 20A and 20B transmit or receive the custom information to or from the authenticated wearable terminal apparatus 10. The disclosure is not limited to this configuration. The disclosure is also applicable to the configuration in which the custom information is transmitted to or received from the wearable terminal apparatus 10 when a wired or wireless communication link is established between the wearable terminal apparatus 10 and each of the image forming apparatuses 20A and 20B. For example, the operation screen (the custom screen) generated using the custom information saved on the wearable terminal apparatus 10 may be displayed on a multifunction apparatus installed in a convenience store when the communication link is established between the wearable terminal apparatus 10 and the multifunction apparatus. In other words, the user may operate in the multifunction apparatus in the convenience store an operation screen thereof identical to the operation screen of an image forming apparatus the user may use on a daily basis. The operation time involved is thus shortened.

According to the exemplary embodiment, the wearable terminal apparatus 10 of a wrist band-type is an example of a portable terminal apparatus. The disclosure is not limited to this configuration. The disclosure is applicable to a portable terminal apparatus wearable and portable by a user, such as a spectacle-type wearable terminal apparatus.

According to the exemplary embodiment, the portable terminal apparatus is the terminal apparatus wearable and portable by the user. The disclosure is not limited to this configuration. The disclosure is applicable to a portable terminal apparatus portable by the user, such as a smart phone or a tablet terminal apparatus.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:
a first information processing apparatus including a first processor that generates personal setting information that is used to set an operation screen on a per user basis, and a communication interface that transmits the personal setting information generated by the first processor to an external apparatus; and
a portable terminal apparatus including a memory that saves the personal setting information transmitted by the first information processing apparatus, and a communication interface that, when the portable terminal apparatus is linked to a second information processing apparatus different from the first information processing apparatus having generated the personal setting information, transmits the personal setting information saved on the memory to the second information processing apparatus.

2. The information processing system according to claim 1, wherein the second information processing apparatus comprises a second processor that performs control to display the operation screen that is generated using the personal setting information when the portable terminal apparatus has transmitted the personal setting information.

3. The information processing system according to claim 2, wherein if a size of the operation screen of the second information processing apparatus is different from a size of an operation screen of the first information processing apparatus having generated the personal setting information, the second processor performs control to modify display contents on the operation screen, generated using the personal setting information transmitted from the portable terminal apparatus, to match with the size of the operation screen of the second information processing apparatus.

4. The information processing system according to claim 3, wherein if the size of the operation screen of the second information processing apparatus is different from the size of the operation screen of the first information processing apparatus having generated the personal setting information, the second processor performs control to modify the size of the operation screen, generated using the personal setting information transmitted from the portable terminal apparatus, to match with the size of the operation screen of the second information processing apparatus.

5. The information processing system according to claim 3, wherein if the size of the operation screen of the second information processing apparatus is different from the size of the operation screen of the first information processing apparatus having generated the personal setting information, the second processor performs control to display the operation screen, generated using the personal setting information transmitted from the portable terminal apparatus, across a plurality of pages to match with the size of the operation screen of the second information processing apparatus.

6. The information processing system according to claim 1, wherein the portable terminal apparatus comprises a display panel that displays an operation screen that is generated using the personal setting information transmitted from the first information processing apparatus.

7. The information processing system according to claim 6, wherein the portable terminal apparatus comprises a third processor that performs control to temporarily suspend a display function of the operation screen of the second information processing apparatus when the display panel displays the operation screen generated using the personal setting information transmitted from the first information processing apparatus.

8. The information processing system according to claim 7, wherein the third processor performs control to modify display contents on the operation screen, generated using the personal setting information transmitted from the first information processing apparatus, to match with a size of an operation screen of the portable terminal apparatus.

9. The information processing system according to claim 8, wherein the third processor performs control to modify the size of the operation screen generated using the personal setting information transmitted from the first information processing apparatus, and display the operation screen in the modified size.

10. The information processing system according to claim 8, wherein the third processor performs control to display the operation screen, generated using the personal setting information transmitted from the first information processing apparatus, across a plurality of pages to match with the size of the operation screen of the portable terminal apparatus.

11. The information processing system according to claim 6, wherein the portable terminal apparatus comprises a third processor that controls an operation of the second information processing apparatus in response to an operation performed by a user on an operation screen displayed on the display panel.

12. The information processing system according to claim 7, wherein the portable terminal apparatus comprises a third processor that controls an operation of the second information processing apparatus in response to an operation performed by a user on an operation screen displayed on the display panel.

13. The information processing system according to claim 8, wherein the portable terminal apparatus comprises a third processor that controls an operation of the second information processing apparatus in response to an operation performed by a user on an operation screen displayed on the display panel.

14. The information processing system according to claim 9, wherein the portable terminal apparatus comprises a third processor that controls an operation of the second information processing apparatus in response to an operation performed by a user on an operation screen displayed on the display panel.

15. The information processing system according to claim 10, wherein the portable terminal apparatus comprises a third processor that controls an operation of the second information processing apparatus in response to an operation performed by a user on an operation screen displayed on the display panel.

16. A non-transitory computer readable medium storing a program causing a computer to execute a process for processing information, the process comprising:
    generating personal setting information that is used to set an operation screen on a per user basis on a first information processing apparatus;
    transmitting the generated personal setting information from the first information processing apparatus to an external apparatus;
    saving on a portable terminal apparatus the personal setting information transmitted from the first information processing apparatus; and
    with a second information processing apparatus different from the first information processing apparatus linked to the portable terminal apparatus, transmitting the personal setting information saved on the portable terminal apparatus to the second information processing apparatus.

* * * * *